United States Patent [19]
Cook et al.

[11] 3,742,836

[45] July 3, 1973

[54] PHOTOGRAPHIC SYSTEM EMPLOYING FILM PROTUBERANCES FOR CONTROLLING THE APPLICATION OF FILM PROCESSING FLUID

[75] Inventors: Gerald H. Cook, Lynnfield; Paul W. Thomas, Duxbury, both of Mass.

[73] Assignee: Polaroid Corporation, Cambridge, Mass.

[22] Filed: Jan. 3, 1972

[21] Appl. No.: 214,909

[52] U.S. Cl. ............. 95/89 R, 95/13, 352/78, 352/130
[51] Int. Cl. ............................................ G03d 3/00
[58] Field of Search ..................... 95/89 R, 13; 352/130, 78, 237, 238; 355/98; 96/39

[56] References Cited
UNITED STATES PATENTS

| | | | |
|---|---|---|---|
| 3,604,790 | 9/1971 | Land | 352/130 X |
| 3,623,417 | 11/1971 | Eloranta et al. | 95/89 R |
| 3,615,127 | 10/1971 | Land | 352/130 X |
| 2,982,195 | 5/1961 | Nicolini | 352/238 X |
| 1,205,367 | 11/1916 | MacBride | 352/238 |

FOREIGN PATENTS OR APPLICATIONS

| | | | |
|---|---|---|---|
| 240,532 | 10/1925 | Great Britain | 352/237 |

*Primary Examiner*—Richard L. Moses
*Attorney*—Robert L. Berger, Robert F. Peck et al.

[57] ABSTRACT

Photographic system employing a motion picture film strip carrying rail-like protuberances which cooperate with a doctor blade processor to precisely space the latter from the film emulsion and thereby express a measured thickness of processing fluid onto the exposed film as the latter is progressively drawn thereacross. Preferably, the film employs margin rails formed by offset edge portions of the film which are configured to interfit with similar portions of adjoining film turns when the film strip is convolutely stored.

13 Claims, 4 Drawing Figures

PATENTED JUL 3 1973　　3,742,836
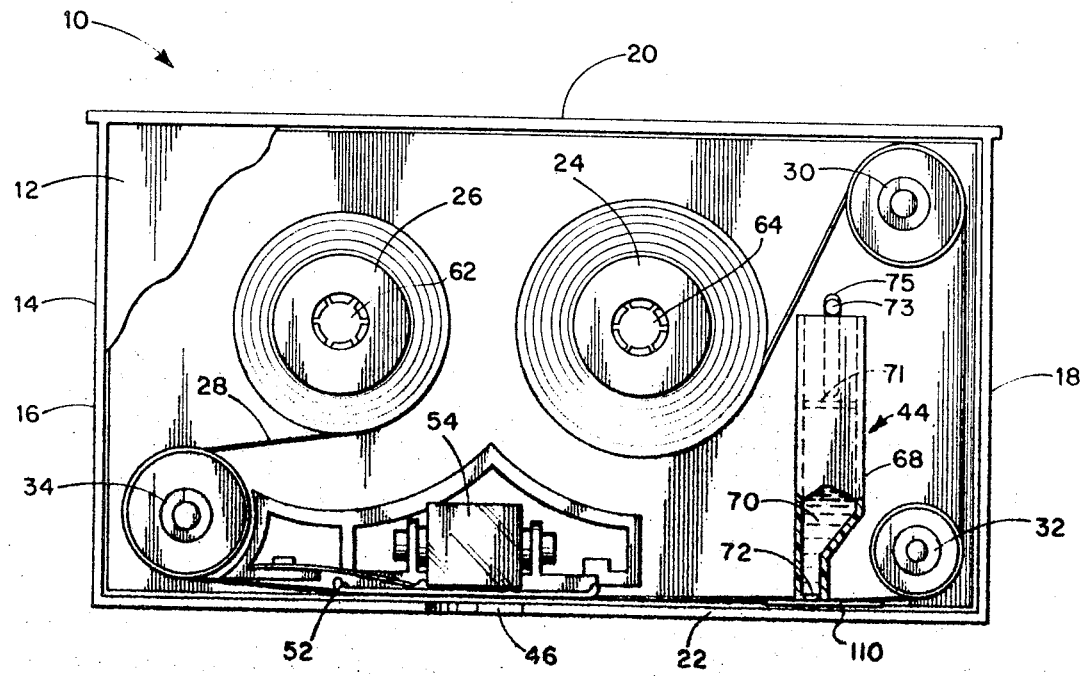
Fig. 1.
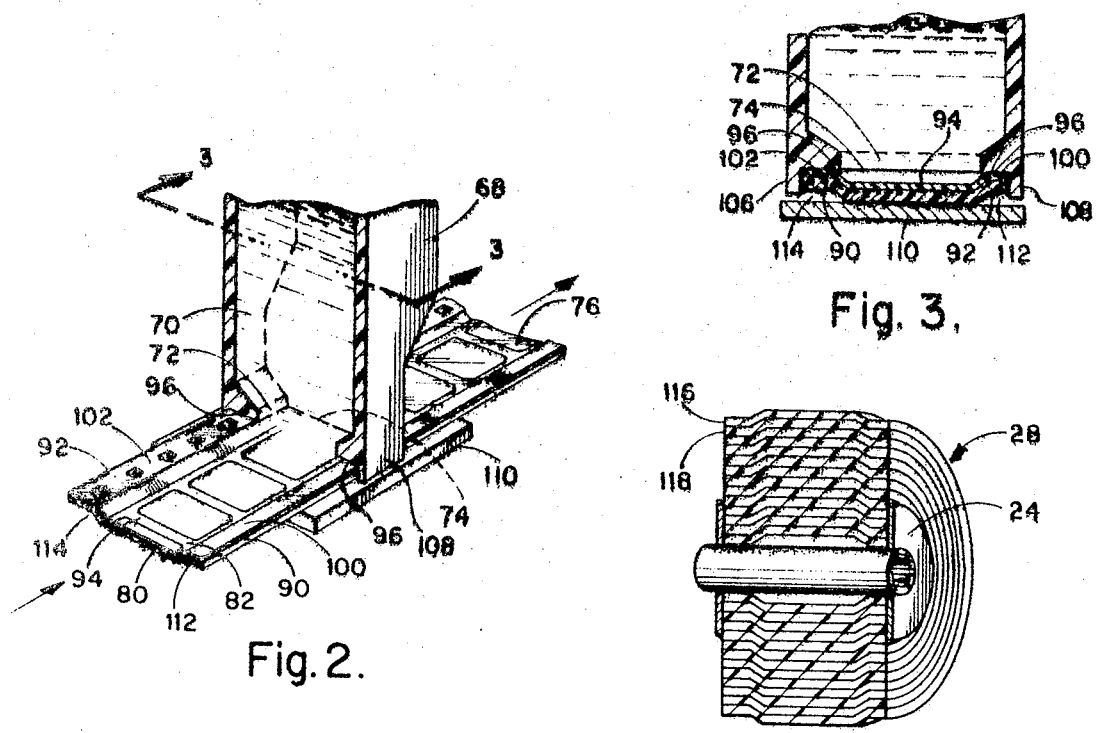
Fig. 2.
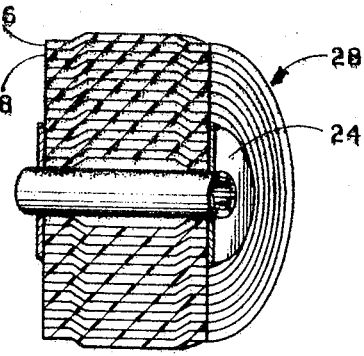
Fig. 3.
Fig. 4.

3,742,836

PHOTOGRAPHIC SYSTEM EMPLOYING FILM PROTUBERANCES FOR CONTROLLING THE APPLICATION OF FILM PROCESSING FLUID

BACKGROUND OF THE INVENTION

1. Field of the Invention

This invention relates to photography and, more particularly, to an improved photographic system for processing of an exposed strip of photographic material.

2. Description of the Prior Art

This invention is directed to a photographic system capable of processing an exposed strip of photographic material to a viewable condition, and more particularly to motion picture systems and apparatus including multipurpose cassettes within which the several operations of exposure, processing and projection of the recorded images are accomplished without transferring the film from the cassette. Exemplary of such cassette systems are those described in prior U. S. Pat. No. 3,615,127 of Edwin H. Land issued Oct. 26, 1971; U.S. Pat. No. 3,537,784 of Rogers B. Downey issued Nov. 3, 1970; and U.S. Pat. No. 3,608,455 of Rogers B. Downey issued Sept. 28, 1971.

Generally these new systems, wherein use is made of a compact, multipurpose film cassette within which the several operations of exposure, chemical processing, drying and projection of the recorded images may be accomplished without once transferring the film from the cassette to any other container or even removing the film from the original cassette, utilize coplanar supply and take-up reels to which opposite ends of the film are permanently attached. The unexposed photosensitive strip, initially wound upon the supply reel, preferably passes from the supply reel through a normally inoperable processing station and then across an opening of the cassette, which functions at different intervals as both an exposure and projection station.

Beyond the exposure station, the film is wound onto a take-up reel in the customary manner. When substantially the entire length of the photosensitive strip in the cassette has been exposed and wound onto the take-up reel, the cassette is then loaded into a special purpose projector in which the motion of the film is reversed, this time passing from the take-up reel onto the supply reel. In its movement in this reverse direction, the film strip is subjected to a processing treatment. In this treatment, a viscous processing fluid is applied to exposed portions of the film strip by means such as, for example, a doctor blade in communication with, and supplied with, fluid from a fluid reservoir. Hence, this arrangement requires a controlled spacing between the film emulsion and the doctor blade.

Consequently, it is a primary object of this invention to provide an improved photographic system for processing a strip of exposed photographic material.

Another primary object of this invention is to provide a compact photographic cassette configured for applying processing fluid to a contained strip of photographic material.

A further object of this invention is to provide an improved apparatus for applying a processing fluid to a strip of exposed photographic material and for compactly storing such material in a convolutely wound arrangement.

SUMMARY OF THE INVENTION

Broadly, photographic apparatus in accordance with this invention comprises a strip of photographic material, means for transporting said film strip along a given path and for directing processing fluid to progressive incremental sections of said film strip during said transport, and said film strip including at least one discontinuity for spacing said sections from said directing means to thereby establish a fluid layer of predetermined thickness.

In the preferred embodiment, the photographic system employs a motion picture film cassette having a pair of coplanarly mounted film spools to which opposite ends of a film strip are attached and upon which the film is convolutely wound for reversible transport thereof across an exposure-projection station and a processing station. The processing station is normally inoperable and is configured for selective operation during rewind of the film strip following its exposure. During this rewind operation, the emulsion side of the film is progressively presented to the processing station as the film is transported thereacross. A doctor blade element of the processing station which is in communication with and supplied with processing fluid from a fluid reservoir, is spaced from the film emulsion by elongated rail-like margins of the film formed by embossed or offset portions of he film edges, which for compactness, are configured to interfit with similar margin portions of adjoining film turns when the film is convolutely wound on the film spools.

BRIEF DESCRIPTION OF THE DRAWINGS

The novel features that are considered characteristic of the invention are set forth with particularity in the appended claims. The invention itself, however, both as to its organization and its method of operation together with additional objects and advantages thereof will be best understood from the following description of the preferred embodiments when read in connection with the accompanying drawings wherein like numbers have been employed in the different figures to denote the same parts and wherein:

FIG. 1 is a diagrammatic cut away plan view of a compact multipurpose motion picture film handling cassette embodying features of this invention;

FIG. 2 is a cut-away view in perspective illustrating the processing station and the film strip depicted in FIG. 1;

FIG. 3 is a cross-sectional view taken along the lines 3—3 of FIG. 2; and

FIG. 4 is a view in section illustrating the convolutely wound condition of the film strip shown in FIG. 1 when it is wound on the supply spool.

DESCRIPTION OF THE PREFERRED EMBODIMENT

In the preferred embodiment of this invention, the film structure comprises a photosensitive image-recording layer and an image-receiving layer in which a visible image may be formed by image-forming substances transferred by diffusion from the photosensitive layer without necessitating subsequent removal of the process photosensitive layer. This highly desirable type of film structure is made possible by a developed negative image having low covering power. A composite film assembly of this type which can be viewed by transmitted light without the necessity of removing the processed, negative image containing photosensitive layer is described in prior U. S. Pat. No. 2,861,885 of Edwin H. Land which issued on Nov. 25, 1958. Other composite film assemblies capable of producing photographic records which can be exhibited in full color without the necessity of removing the processed photosensitive layer are shown in prior U. S. Pats. of Edwin H. Land Nos. 2,726,154 issued Dec. 6, 1955 and 2,944,894 issued July 12, 1960. However, it should be noted that while an illustrated preferred embodiment of the invention utilizes a film structure not requiring the removal of the photosensitive layer after visible information is completed, the invention itself is applicable for use with other type of processing fluids and film structures.

The illustrated preferred embodiment of this invention may best be understood by first referring to FIG. 1 of the drawings wherein a plan view of a compact multipurpose film handling cassette 10 is shown. The cassette 10 is basically constituted by a pair of planar, side walls 12 and 14 joined together at their edges by two end walls 16 and 18 and elongated top and bottom walls 20 and 22 to form a substantially opaque housing. Within the cassette 10, a supply spool or reel 24 and a take-up spool or reel 26 are coplanarly mounted for rotation about parallel axes. A strip of unexposed photographic material 28, of the type previously discussed is affixed at each end, respectively, to the supply and take-up reels 24, 26 and initially substantially entirely coiled around the supply reel. In traveling from the latter to the take-up reel 26, the film strip 28 sequentially passes around idlers 30, 32 and 34 which are appropriately positioned at the corners of the cassette 10.

In its extended path from the supply reel 24 to the take-up reel 26, the film strip 28 passes through a plurality of functional stations which are utilized at different periods in the life cycle of the cassette 10. It should be noted, however, that the order of passage of the film strip 28 through these several stations is not the same as the sequence with which the stations are brought into operation. From the supply reel 24, the film strip 28 passes first through a processing of film development station 44 and then across an opening 46 of the bottom wall 22, which at different times facilitates both exposure and projection of the film strip.

In this arrangement, the opening 46 facilitates both exposure and projection inasmuch as it permits image-bearing light rays to impinge on progressive incremental sections of the film strip 28 when the cassette is operated in a camera (not shown) and to subsequently permit light rays from an external source to be directed through the incremental sections of the film strip and from opening 46 outwardly of the cassette for projection operations when the cassette is operated in a suitable projector (not shown). Thus the opening 46 first comprises an exposure station and subsequently a projection station of the cassette 10. To facilitate these functions, a pressure plate 52 is mounted in adjoining relation to the opening 46 and is configured to cooperate with an appropriate aperture plate (not shown) of the camera and the projector (not shown) to position the film in a proper film plane. Mounted behind opening 46 is a prismatic reflector element 54 which is configured to direct light outwardly through the film strip 28 during projection operations. Additionally, a baffle member 56 extends around opening 46 and element 54 to prevent light from penetrating the interior of the cassette 10.

The processing station 44, as later explained in greater detail with respect to FIGS. 2 and 3, is normally inoperative and is configured to deposit fluid upon the film strip during a selected passage of the latter. Hence, the processor 44 is rendered operable at a selected time following exposure of the photosensitive surface. This processing operation is generally completed during rewind of the film from the take-up reel to the supply reel immediately subsequent to its exposure.

As previously indicated the cassette 10 is initially furnished with a film strip 28 in its photosensitive condition substantially completely coiled on the supply reel 24. For exposure purposes the cassette 10 is mounted in an appropriate camera (not shown) with the drive means of the latter engaging a recess 62 in the hub of the take-up reel 26. In this use, light rays from the scene being photographed are focused by the camera lens through the camera shutter and the cassette opening 46 onto the photosensitive film strip 28 during its passage from the supply reel 24 to the take-up reel 26. During this exposure sequence, the processing station 44 is passive. After the entire length of the film has been exposed to image-bearing light, substantially all of the film will then have been coiled onto the take-up reel 26 and unwound from the supply reel 24.

The next stage of operation, the film processing stage, may be accomplished in the same camera in which the film was exposed but is preferably accomplished in a projector (not shown) during rewind of the exposed film from the take-up reel 26 to the supply reel 24. Processing is accomplished in part by means of a container 68 having therein a supply of viscous developing fluid 70. As shown more clearly in FIG. 2, the fluid 70 is directed to or deposited on the film strip 28 from an orifice 72 just in front of a doctor blade 74 which distributes the fluid on the surface of the film. One way this may be accomplished is by means of a plunger 71, (see FIG. 1) which is movable, piston-like within the container 68. The plunger 71 may be biased in the direction of the orifice 72 by a plunger driver 73 projecting inward through a slot 75 in the wall of the cassette. Before the plunger driver 73 is brought to bear against the plunger 71, the processing fluid 70 may be prevented from leaking out to the orifice 72 by a rupturable membrane (not shown) which is disposed across the orifice and is capable of being broken by the application of a sufficient force to the plunger. Additionally the plunger driver 73 may cooperate with and even be a part of the projector mechanism and hence, is brought into action by the projector during the time that the film is being rewound onto the supply reel. The plunger driver 73 should be mounted such that its entry through the wall 12 of the cassette is baffled to prevent light from entering this area prior to development of the film. It should be noted that in other arrangements, the system can be designed for gravity flow of the fluid 70 through the orifice 72. However, the invention is not per se directed to the means by which fluid is caused to flow through the orifice.

As shown more clearly in FIGS. 2 and 3, the orifice 72 acts as a nozzle which feeds the viscous film processing fluid 70 to only that width of the photosensitive film strip surface on which images have previously been recorded. Herein, the nozzle trailing edge 74 (when considered with respect to the film rewind direction as shown by the arrows in FIG. 2) operates as a doctor blade which cooperates with the film strip 28 to deposit a metered amount of the fluid 70 on the film in a thin layer 76. The film 28 is illustrated as including a base layer 80 and an emulsion layer 82. In this unique system, the film 28 is embossed or offset along its lateral margins so as to provide discontinuities 90 and 92 configured to cooperate with the processor 44 to control the final thickness of the applied layer of fluid 70. In the illustrated embodiment, the discontinuities are elongated protuberances or rails which extend above the emulsion surface portion 94 in which the images are recorded. The rails 90 and 92 engage the nozzle surface 96 of the container 68 along the lateral end of the doctor blade 74 and space the latter a precise distance above the image surface 94. Hence, the rails 90 and 92 provide means cooperating with the processor 44 or its doctor blade 74 to establish a predetermined thickness of the fluid layer 76 on the film emulsion 82.

As can be seen more clearly in FIG. 3, the nozzle surface 96 is coplanar with the doctor blade edge 74 in this embodiment. Hence the rail height, which is defined herein as the height of the projection above the emulsion surface 94, is equal to the desired spacing of the doctor blade from this surface. Preferably, the doctor blade spacing is approximately 0.001 inch, and hence, the rail height is approximately this value. It should be noted, however, that the thickness of the fluid layer 76 is not always equal to the doctor blade spacing and is, in fact, often approximately one-half the latter spacing. Hence, the rail height is preferably approximately equal to twice the desired fluid layer thickness.

As previously indicated, the orifice 72 and the doctor blade 74 preferably extend across only an intermediate portion of the film on which the latent images are recorded. In this way no processing fluid 70 is applied to the upper rail surfaces 100 and 102, and these may be employed as dry-bearing surfaces in the passage of the film to supply spool 24. It should also be noted that the container 68 also includes wall portions 106 and 108 which extend below the plane of the nozzle and provide side guides for the film 28. A pressure plate or pad 110 pre-positioned beneath the film, which is urged into contact therewith by appropriate means (not shown), is employed to insure contact between the rails 90 and 92 and the nozzle surface 96. In this embodiment, pad 110 is a flat planar element, however, it should be noted that the latter could be contoured (not shown) to conform to the lower surface of the film strip 28 to prevent any tendency of the latter to bow during fluid application.

In order to provide a highly compact cassette, the margin rails 90 and 92 are also configured such that their protruding portions (bearing surfaces 100 and 102) on the emulsion side of the film are complementary to their bottom surfaces such that surfaces 100 and 102 will fit within the concave or indented portions 112 and 114 of base layer 80. This complementary arrangement is accomplished by the inclined inner edges of the rails. The interfit is shown in FIG. 4 wherein the film wrap on reel 24 is illustrated in cross section. As can be seen in this figure, the rails 90 and 92 of any one turn (e.g., outer turn 116) interfit with those of the next underlying (e.g., turn 118) of the film such that the overall diameter of the film wrap is substantially equal to that anticipated for film without film rails. Hence, the rails are preferably constructed to provide a spacing function at the processor while also eliminating any such spacing function during film storage.

It should be understood that for spacing the doctor blade 74, the rails 90 and 92 may be any suitable protuberance and need not be of the type which will provide an interfit when the film is convolutely wound on the reels 24 and 26. Further, the rails may be formed as thickened portions of the film, or may be separate strips of inert material adhersively applied to the latter. However, at least in the latter case, the compact interfit of the film wrapup would be lost.

Those familiar with the motion picture arts will readily appreciate the novel and highly unique advantages of this photographic cassette system. A compact multipurpose cassette is provided in which the film strip is permanently retained for exposure, processing and projection operations and includes film spacers which facilitate processing of the film strip subsequent to its exposure and which are also configured to minimize the space occupied by the film when it is stored.

This invention may be practiced or embodied in still other ways without departing from the spirit or essential character thereof. The preferred embodiments described herein are thereof illustrative and not restrictive, the scope of the invention being indicated by the appended claims and all variations which come within the meaning of the claims are intended to be embraced therein.

What is claimed is:

1. A photographic film handling cassette comprising a housing, a strip of photographic film retained within said housing, means for facilitating advancement of said film strip along a given path responsive to external drive means, and means including an applicator member for directing processing fluid onto progressive incremental sections of one surface of said film strip as it is advanced across said applicator member so that a layer of such fluid may be provided along substantially the entire length of said one surface, said film strip including spacing means arranged along said one surface so as to space adjoining portions of said one surface from said applicator member so as to establish a predetermined thickness of such fluid layer on said portions of said one surface.

2. The cassette of claim 1 additionally including means for storing said film strip in a layered arrangement with portions thereof interposed between other portions thereof, and said spacing means of one film layer being configured to interfit with similar spacing means of other film layers so as to minimize the spacing between adjacent film layers when said film strip is stored in its said layered arrangement.

3. A photographic film handling cassette comprising a housing, a strip of photographic film retained within said housing, means for cooperating with external means so as to transport said film strip along a given path, and means for directing processing fluid onto progressive incremental sections thereof whereby a fluid layer may be provided along substantially the entire length of said film strip, said film strip including one or more discontinuities arranged along its length for cooperating with said directing means to establish a predetermined thickness of such fluid layer, said directing means including a doctor blade element located transverse to said path of said film, said discontinuities including raised marginal portions of said film strip configured for spacing the emulsion surface of said film strip from said doctor blade element during said transport, said raised marginal portions being approximately equal to twice the predetermined thickness of such fluid layer.

4. A photographic film handling cassette comprising a housing, a strip of photographic film retained within said housing, means for cooperating with external means so as to transport said film strip along a given path, and means for directing processing fluid onto progressive incremental sections thereof whereby a fluid layer may be provided along substantially the entire length of said film strip, said film strip including one or more discontinuities arranged along its length for cooperating with said directing means to establish a predetermined thickness of such fluid layer, said directing means including a doctor blade element located transverse to said path of said film, said discontinuities providing means for spacing said film from said doctor blade element during said transport of said film thereacross, said discontinuities including embossed marginal portions of said film strip which are raised above the emulsion surface thereof.

5. A photographic film handling cassette comprising a housing, a strip of photographic film retained within said housing, means for cooperating with external means so as to transport said film strip along a given path, and means for directing processing fluid onto progressive incremental sections thereof whereby a fluid layer may be provided along substantially the entire length of said film strip, said film strip including one or more discontinuities arranged along its length for cooperating with said directing means to establish a predetermined thickness of such fluid layer, said directing means including a nozzle surface having an orifice configured for communication between a source of processing fluid and one surface of said film strip and means for doctoring the fluid directed to said one surface from said nozzle orifice, and said discontinuities of said film strip provide means for spacing said nozzle surface and said doctoring means from at least a centrally located portion of said one surface.

6. A photographic film handling cassette comprising a housing, a strip of photographic film retained within said housing, means for cooperating with external means so as to transport said film strip along a given path, and means for directing processing fluid onto progressive incremental sections thereof whereby a fluid layer may be provided along substantially the entire length of said film strip, said film strip including one or more discontinuities arranged along its length for cooperating with said directing means to establish a predetermined thickness of such fluid layer, said directing means including a doctor blade element located transverse to said path of said film strip, said discontinuities providing means for spacing portions of said film strip from said doctor blade element during said transport of said film thereacross, said discontinuities including raised marginal portions of said film strip configured to engage surface portions adjacent the ends of said doctor blade element.

7. A photographic film handling cassette comprising a housing, a strip of photographic film retained within said housing, means for cooperating with external means so as to transport said film strip along a given path, means for directing processing fluid onto progressive incremental sections thereof whereby a fluid layer may be provided along substantially the entire length of said film strip, said film strip including one or more discontinuities arranged along its length for cooperating with said directing means to establish a predetermined thickness of such fluid layer, and means for storing said film strip in a layered arrangement with portions thereof interposed between other portions thereof, and said discontinuities include offset marginal portions of said strip providing raised protuberances configured to interfit with protuberances of other layers of such film strip so as to minimize the spacing between adjacent layers when said film strip is in its stored arrangement.

8. The cassette of claim 7 wherein said storing means includes means for convolutely storing said film strip, and wherein said discontinuities of said film strip include raised protuberances configured to space portions of said film strip from said directing means, and protuberances of a given turn of said film strip being configured to interfit with protuberances of adjoining turns thereof when said film strip is convolutely stored.

9. A photographic system comprising a housing, a strip of photographic film retained within said housing, means for directing processing fluid to a given surface of said film strip and for cooperating with external means so as to effect relative motion between said film strip and said directing means whereby a fluid layer may be provided along substantially the entire length of said film strip, said film strip including means for cooperating with said directing means to establish a predetermined thickness of such fluid layer, and means for convolutely storing said film strip, said cooperating means of said film strip including raised protuberances configured to engage said directing means and space it from said film strip, and said protuberances being configured to interfit with similar protuberances of adjoining turns when said film strip is convolutely stored.

10. A photographic film handling cassette comprising a housing, a strip of photographic film retained within said housing, means for cooperating with external means so as to transport said film strip along a given path, and means for directing processing fluid onto progressive incremental sections thereof whereby a fluid layer may be provided along substantially the entire length of said film strip, said film strip including one or more discontinuities arranged along its length for cooperating with said directing means to establish a predetermined thickness of such fluid layer, said discontinuities of said film strip comprising edge portions of the longitudinal margins of said film which are offset above the emulsion surface of said film strip.

11. The cassette of claim 10 additionally including means for storing said film strip in a layered arrangement with portions thereof interposed between other portions thereof, and wherein said edge portions of the longitudinal margins of said film provide raised protuberances on the emulsion side of said film and concavities on the other side of said film opposite said emulsion side, said concavities being complementary to said protuberances and configured to interfit therewith when said film strip is stored in said layered arrangement.

12. A photographic system comprising a housing, a strip of photographic film retained within said housing, means including an applicator member for directing processing fluid to a one surface of said film strip, and means for effecting relative motion between said film strip and said applicator member so that a fluid layer may be provided on said one surface along substantially the entire length of said film strip, said film strip including means arranged along the length of said one surface for spacing adjoining portions of said one surface from said applicator member so as to establish a predetermined thickness of such fluid layer on said portions of said one surface.

13. A photographic system comprising a housing, a strip of photographic film retained within said housing, means for directing processing fluid to a given surface of said film strip and for cooperating with external means so as to effect relative motion between said film strip and said directing means whereby a fluid layer may be provided along substantially the entire length of said film strip, said film strip including means for cooperating with said directing means to establish a predetermined thickness of such fluid layer, and means for storing said film strip in a layered arrangement with portions thereof interposed between other portions thereof, said cooperating means of said film strip including raised protuberances configured to interfit with protuberances of other layers of said film strip so as to minimize the spacing between adjacent layers thereof when said film strip is stored in its said layered arrangement, said protuberances being offset marginal portions of said film strip.

* * * * *